(12) United States Patent
Theisen

(10) Patent No.: US 8,851,727 B1
(45) Date of Patent: Oct. 7, 2014

(54) VEHICLE TAIL LIGHT OPERATIONAL INDICATOR

(76) Inventor: Daniel Theisen, Belgrade, MT (US)

( * ) Notice: Subject to any disclaimer, the term of this patent is extended or adjusted under 35 U.S.C. 154(b) by 291 days.

(21) Appl. No.: 13/530,170

(22) Filed: Jun. 22, 2012

(51) Int. Cl.
  *B60Q 1/06* (2006.01)
  *B60Q 11/00* (2006.01)
(52) U.S. Cl.
  CPC .................................. *B60Q 11/005* (2013.01)
  USPC ........................... 362/523; 362/540; 248/486
(58) Field of Classification Search
  None
  See application file for complete search history.

(56) References Cited

U.S. PATENT DOCUMENTS

| | | |
|---|---|---|
| 1,462,065 A | 7/1923 | Lee |
| 1,538,177 A | 5/1925 | Deery |
| 1,596,010 A | 8/1926 | Fiorentino |
| 4,642,737 A | 2/1987 | Meyers, Jr. |
| 4,811,173 A | 3/1989 | Johnson |
| 4,884,172 A | 11/1989 | Walker |
| 4,905,376 A * | 3/1990 | Neeley ............................ 33/264 |
| 4,925,287 A * | 5/1990 | Lord et al. ..................... 359/872 |
| 5,276,594 A | 1/1994 | Burkett et al. |
| 6,022,116 A * | 2/2000 | Osborn ......................... 359/872 |
| 6,062,697 A * | 5/2000 | Bryant et al. ................. 359/841 |
| 6,619,685 B2 * | 9/2003 | Teague ......................... 280/477 |
| 7,284,869 B1 * | 10/2007 | Weaver ......................... 359/872 |
| 8,069,548 B2 * | 12/2011 | Radgens .................... 29/525.11 |
| 2010/0180420 A1 | 7/2010 | Radgens |

* cited by examiner

*Primary Examiner* — Britt D Hanley
(74) *Attorney, Agent, or Firm* — Robert C. Montgomery; Montgomery Patent & Design

(57) ABSTRACT

A vehicle tail light operational indicator is mounted to a vehicle tail light to visually communicate the proper operation of turn signals, tail lights, and brake lights to an operator seated in the driver's seat of a motor vehicle. The vehicle tail light operational indicator comprises a reflecting light bar positioned to be viewable in a side view mirror of the vehicle. The vehicle tail light operational indicator further comprises a pair of base anchors that are adhesively attached to a vehicle tail light and which support the light bar. Each base anchor further includes a hinge and threaded adjuster which allows adjustment of the vehicle tail light operational indicator on various tail light designs as well as allowing the vehicle tail light operational indicator to pivot without damage if accidentally struck by an object while driving.

15 Claims, 6 Drawing Sheets

VEHICLE TAIL LIGHT OPERATIONAL INDICATOR

RELATED APPLICATIONS

There are currently no applications co-pending with the present application.

FIELD OF THE INVENTION

The presently disclosed subject matter is directed towards vehicle signal lights. More specifically the present invention relates to indicators for determining whether a vehicle's tail lights are working.

BACKGROUND OF THE INVENTION

Automobiles, truck, trailers, and other vehicles are required by law to have approved lighting devices. Such lighting devices provide illumination, indicate a vehicle's presence and width, indicate braking, and inform others when a vehicle is turning or about to change lanes. To such ends both Federal and State laws mandate the color, location, number, height above ground, illumination intensity and other aspect of vehicle lighting.

If a vehicle's lighting is substandard, such as having a bulb, fuse, or switch out a driver can be ticketed for operating an unsafe vehicle. While nobody likes getting a ticket for non-working vehicles lights the reasons for enforcement are obvious. Furthermore, operating a vehicle with substandard lighting is dangerous and an all too-common source of accidents.

Determining the proper operation of headlights is simple: they either work and you can observe their illumination or they do not work and you can determine from the lack of illumination that they are not working. However, determining the proper operation of a vehicle's tail lights is far more difficult. One (1) way of doing so is to leave the vehicle, have another person operate the lights, turn signals, and brakes, and directly observe the proper operation. While extremely effect, that method is only applicable to stationary vehicles. It is also possible to use a second vehicle that follows the first to determine if the first vehicle's lighting is operating properly. This requires two (2) vehicles, two (2) drivers, and a coordinated, pre-planned activity it is not particularly practical.

Therefore, devices for allowing drivers to determine the proper operation of their vehicle's tail lighting would be useful. Particularly beneficial would be low cost devices that enable drivers to determine the proper operation of their vehicle's tail lighting. Preferably such devices would be easy to use and useful with existing rear vehicle lighting systems.

SUMMARY OF THE INVENTION

The principles of the present invention provide for devices that enable vehicle drivers to determine the proper operation of their vehicle's tail lighting. Those principles enable low cost devices that are easily added to existing vehicles.

A vehicle tail light operational indicator in accord with the present invention includes a transparent light bar assembly having a light bar with integral first and second arms that perpendicularly extend from the remainder of the light bar. The first and second arms beneficially terminate in associated pivot assembly inner members. The vehicle tail light operational indicator further includes an elongated threaded receiver for each arm. That receiver includes a "U"-shaped yoke pivot assembly outer member at one (1) end of an extended male threaded member that threads into an elongated internal female threaded member. That female member terminates in an associated anchoring assembly inner member. The vehicle tail light operational indicator further includes first and second anchor assemblies, each having an integral rectangular base and two (2) perpendicularly extending anchoring assembly outer members that are dimensioned to receive an anchoring assembly inner member. Each pivot assembly inner member mates with a pivot assembly outer member to a form a single-axis pivot assembly, and each anchoring assembly inner member mates with two anchoring assembly outer members to form a three-element single-axis hinge that uses a bolt as an axle. The male threaded member forms a collinear length adjustable connection with an elongated internal female threaded member.

The vehicle tail light operational indicator may include axles for coupling the pivot assembly inner members to the pivot assembly outer members. The light bar assembly and the threaded receivers may be comprised of transparent stock, beneficially round stock. The anchor assemblies are beneficially configured to attach to a vehicle tail light using double-faced adhesive tape. The collinear length adjustable connection should be locked using a jam nut, and metallic friction washers should be disposed between the anchoring assembly inner members and the anchoring assembly outer members. A reflective cap may be affixed to the light bar, which may have a metallic reflective layer applied to an inner surface.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

| | DESCRIPTIVE KEY |
|---|---|
| 10 | vehicle tail light operational indicator |
| 20 | light bar assembly |
| 22 | light bar |
| 24 | first arm |
| 26 | second arm |
| 29 | first aperture |
| 30 | anchoring assembly |
| 31 | threaded receiver |
| 32 | female threaded member |
| 33 | jam nut |
| 34 | base plate |
| 35 | anchoring assembly inner member |
| 36 | anchoring assembly outer member |
| 38 | friction washer |
| 40 | bolt |

-continued

| DESCRIPTIVE KEY | |
|---|---|
| 41 | second aperture |
| 42 | nut fastener |
| 44 | double-faced adhesive layer |
| 46 | wax paper layer |
| 60 | pivot assembly |
| 61 | pivot assembly inner member |
| 62 | pivot assembly outer member |
| 63 | pivot assembly axle |
| 64 | male threaded member |
| 70 | reflective cap |
| 72 | reflective layer |
| 80 | threaded fastener |
| 100 | vehicle |
| 105 | tail light |
| 106 | light |
| 110 | rear-view minor |

DETAILED DESCRIPTION OF THE PREFERRED EMBODIMENT

Figure 1:
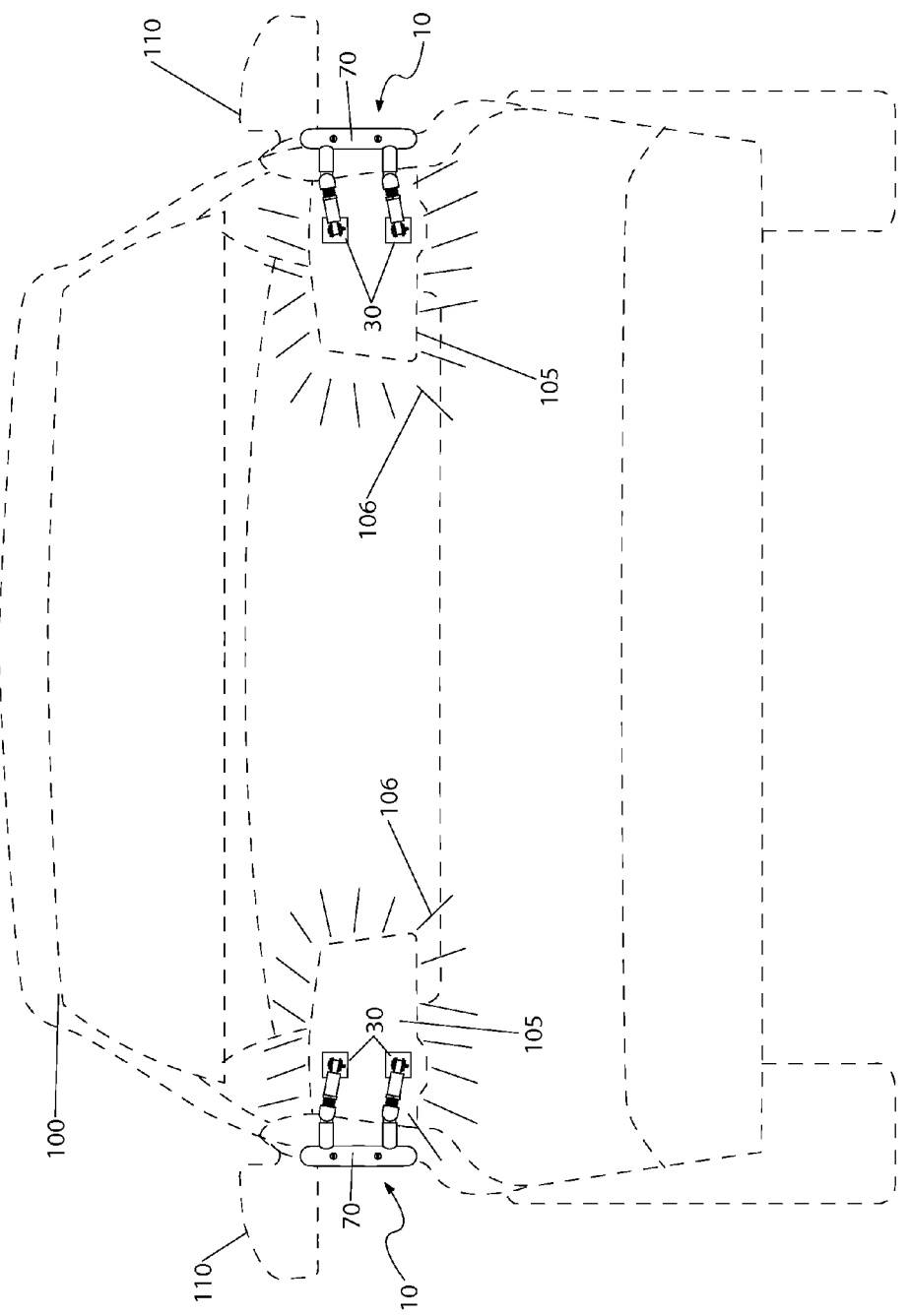
FIG. 1 shows a rear view of a vehicle 100 equipped with a pair of vehicle tail light operational indicators 10 that are in accord with the principles of the present invention.
Figure 2:
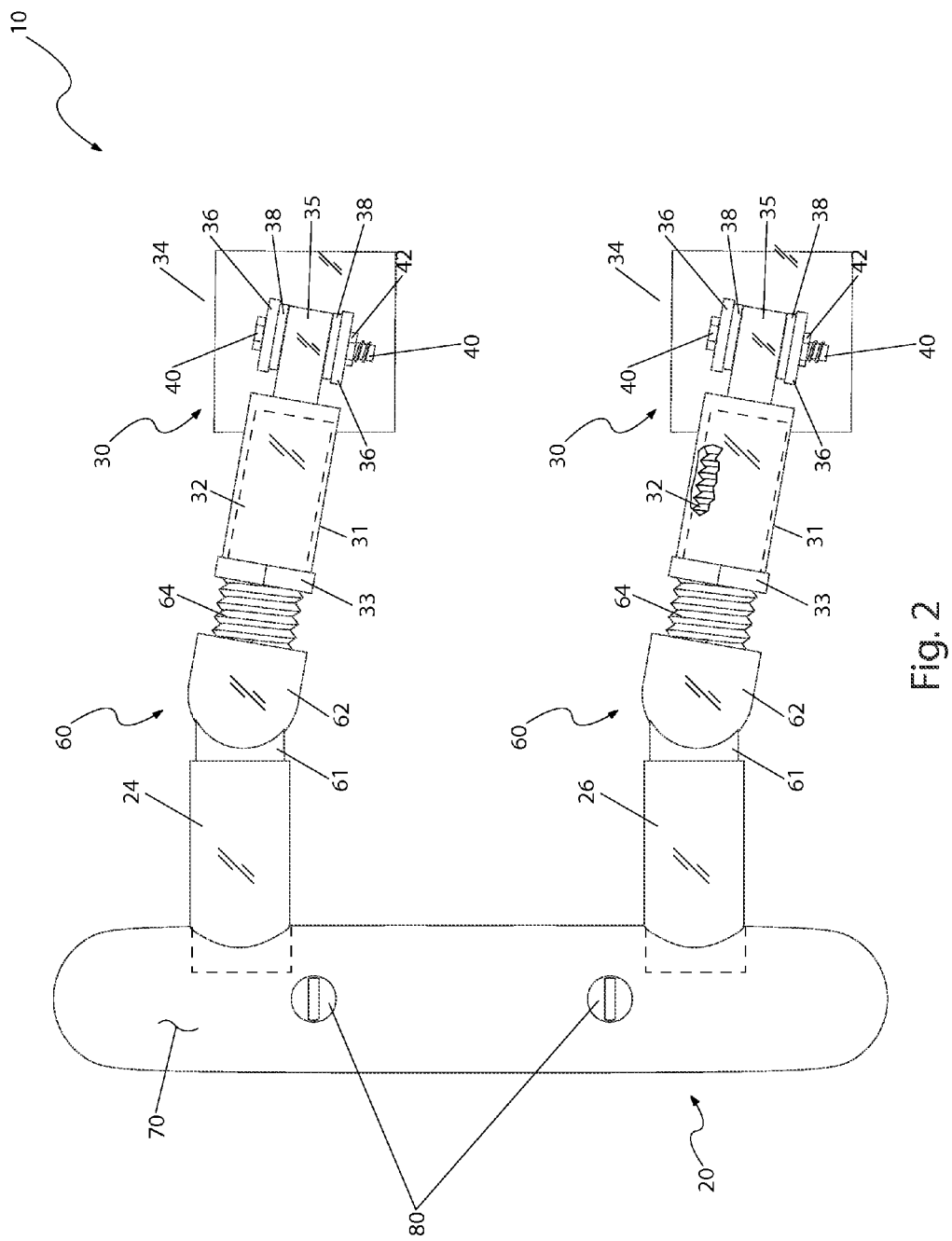
FIG. 2 is a rear view of a vehicle tail light operational indicator 10 according to a preferred embodiment of the present invention.
Figure 3:
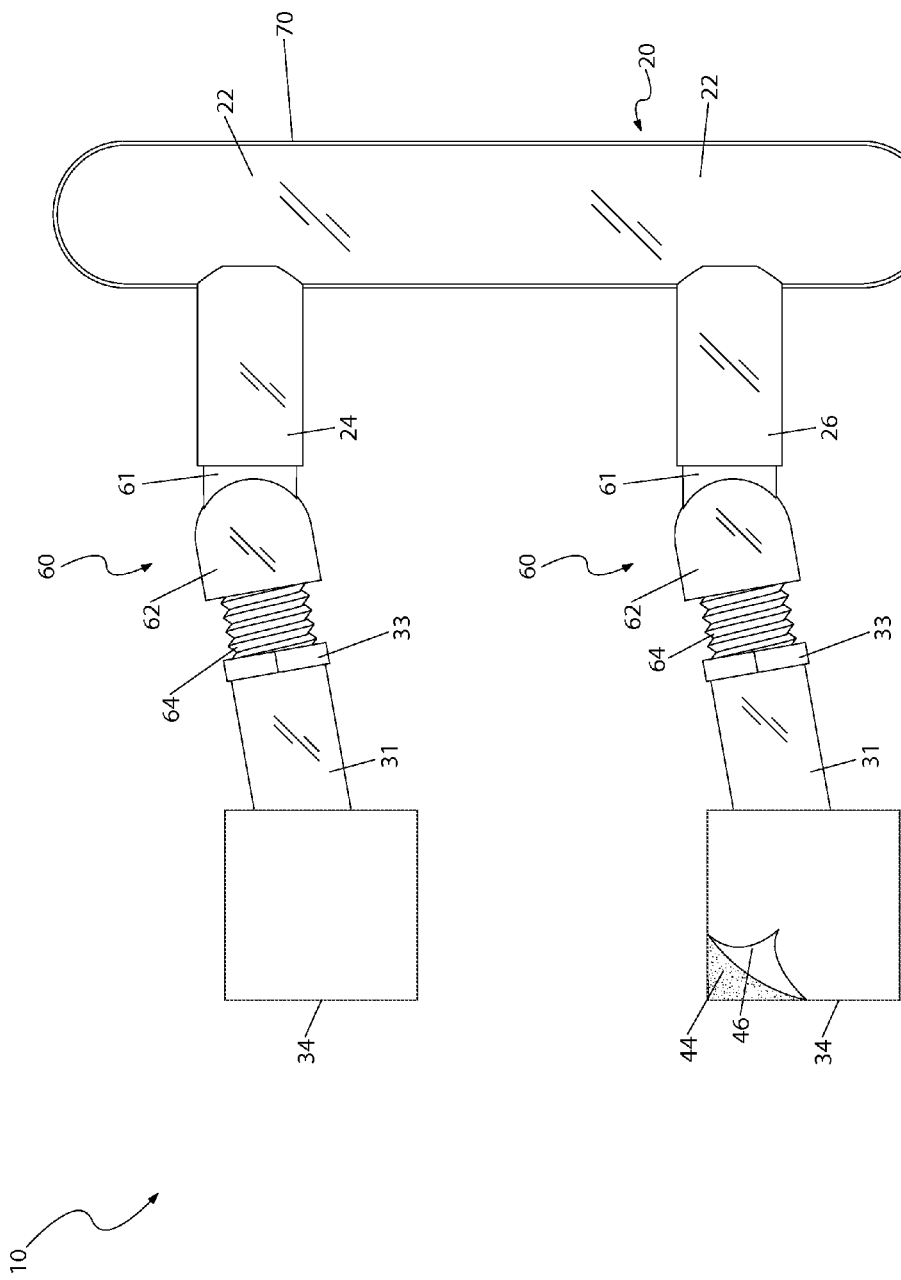
FIG. 3 is a front view of the vehicle tail light operational indicator 10 illustrated in FIG. 2.

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

FIG. 1 illustrates a rear view of a vehicle 100 that is equipped with vehicle tail light operational indicators 10. The vehicle tail light operational indicators 10 provide a means to visually communicate the proper operation of tail lights 105 to a driver inside the vehicle 100. The vehicle tail light operational indicators 10 are mounted on the lens of the tail lights 105 and reflect light 106 from the tail lights 105 to the driver via rear-view mirrors 110.

Still referring to FIG. 1, each vehicle tail light operational indicator 10 includes a reflecting light bar 20 that is adhesively mounted to a rear or side surface of a tail light 105 via a pair of anchoring assemblies 30. The anchoring assemblies 30 enable adjustments that allow selective positioning of the light bars 20 to be visible to the driver using the rear-view mirrors 110. The vehicle tail light operational indicator 10 allows the driver to activate the various functions of the tail lights 105 such as turn signals, brake lights, and the like, to verify their proper operation while remaining in the vehicle 100. Furthermore, additional checks of tail lights 105 may be performed at any time while operating the vehicle 100. The vehicle tail light operational indicators 10 may be left in place at all times and includes features that protect the vehicle tail light operational indicators 10 from environmental hazards and accidental impact (see below).

Refer now to FIGS. 2 and 3 where, respectively, rear and front views of a vehicle tail light operational indicator 10 are shown. The vehicle tail light operational indicator 10 includes the light bar assembly 20. The light bar 20 has an integral first arm 24 and an integral second arm 26 that perpendicularly extend from the remainder of the light bar 20 in a parallel manner. The first arm 24 and the second arm 26 each terminate at their distal ends in an integral pivot assembly inner member 61. The light bar 20 and its arms 24, 26 are transparent rod-shaped elements, typically about one-half (½) inch in diameter and are made of rugged plastic round stock using a material such as LUCITE® or an equivalent clear plastic.

Figure 4:
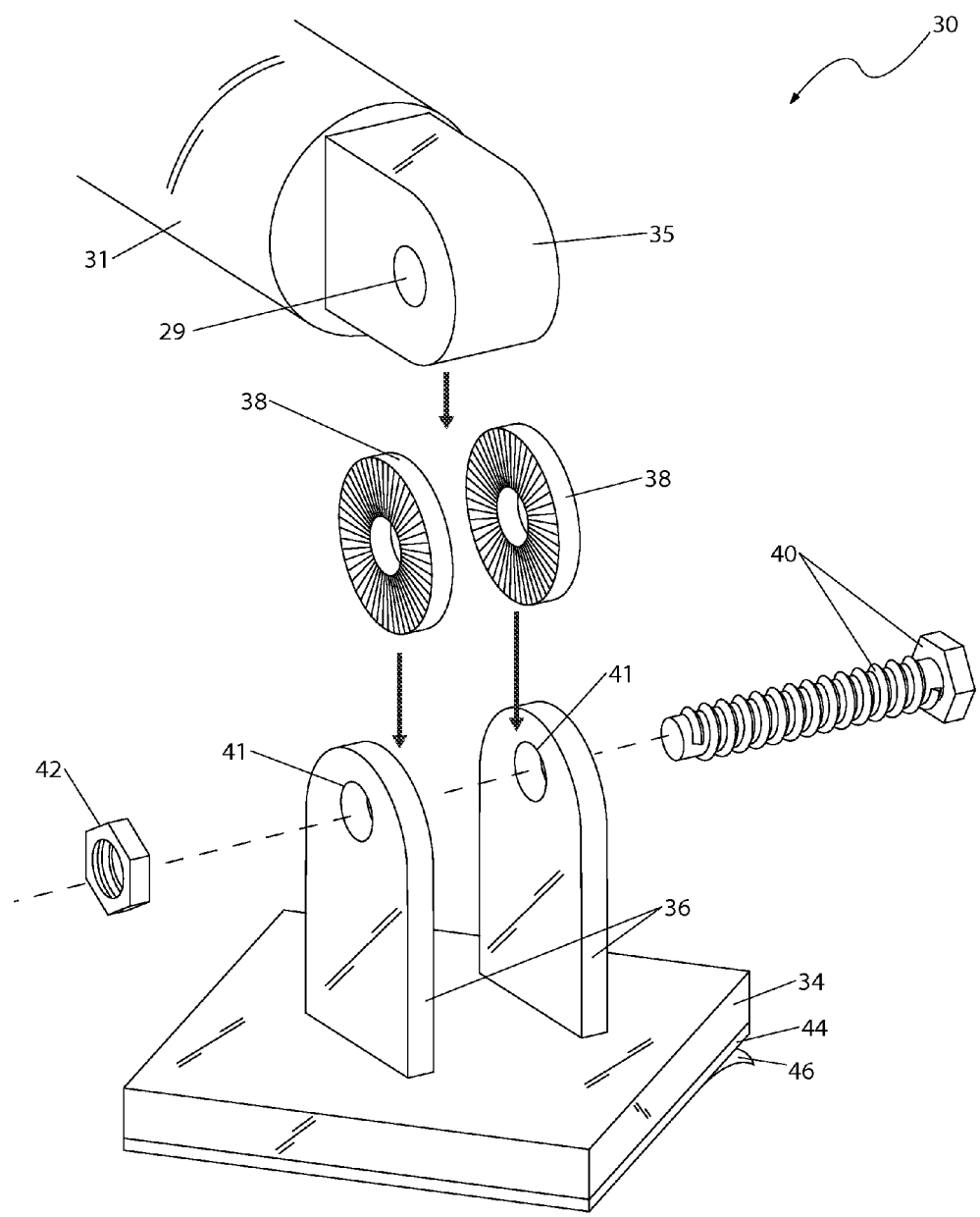
FIG. 4 is an exploded view of an anchoring assembly 30 of the vehicle tail light operational indicator 10 illustrated in FIGS. 2 and 3.
Figure 5:
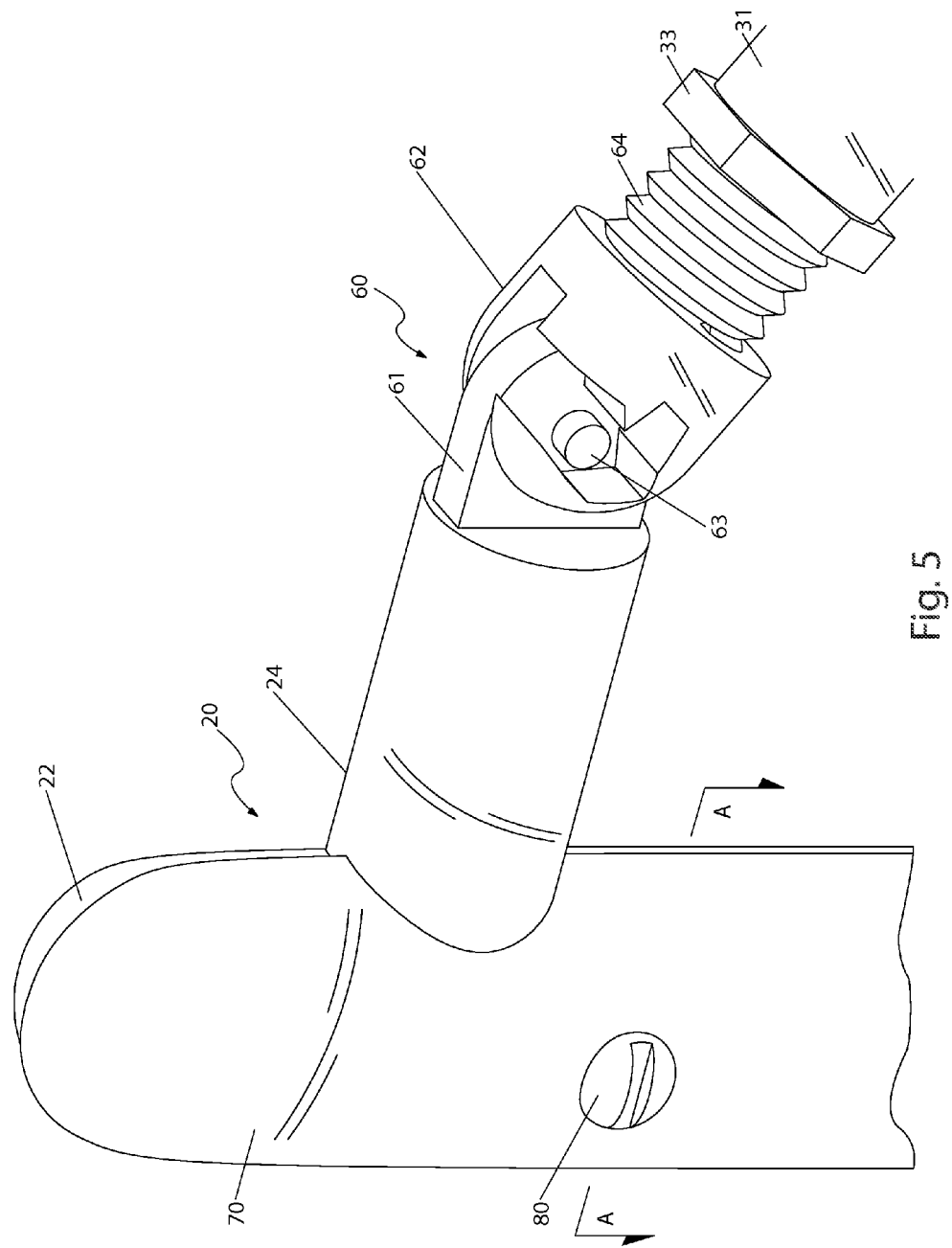
FIG. 5 is a partial break-away view of a first arm 24 and a first arm pivot 62 of the vehicle tail light operational indicator 10 illustrated in FIGS. 2 and 3; and, FIG. 6 is a section view of a light bar 22 along section line A-A of FIG. 5.

Referring now to FIGS. 3-5, at their distal ends each arm 24, 26 is rotationally attached to a respective threaded receiver 31. Attachment is via pivot assemblies 60 that are formed from a pivot assembly outer member 62 of the threaded receiver 31 that mates with a pivot assembly inner member 61 of the arms 24, 26 using a pivot assembly axle 63. The pivot assembly axle 63 can be an integral part of either the pivot assembly inner member 61 or the pivot assembly outer member 62, or the pivot assembly axle 63 can be a separate rod that passes through the pivot assembly inner member 61. Each pivot assembly 60 forms a three-element, single-axis hinging device which allows relative angular adjustment between the arms 24, 26 and their respective threaded receiver 31 in one direction only. This enables adjusts as described subsequently without damage to the light bar 20.

Referring now primarily to FIGS. 2 and 5, the pivot assembly outer members 62 comprise a "U"-shaped yoke design that has an extended male threaded member 64 which threads into an internal female threaded member 32 of the threaded receivers 31. This establishes a strong collinear connection that provides threaded linear adjustability. The less the extended male threaded member 64 is screwed into the internal female threaded member 32 the longer the collinear connection is. Once the length of the collinear connection is set a jam nut 33 can be tightened against the threaded receiver to secure that length. The threaded receivers 31 also are beneficially constructed of transparent round stock approximately three-quarters (¾) to one (1) inch in diameter.

Referring now primarily to FIGS. 2 and 4, one end of each threaded receiver 31 provides a rotatable attachment to respective anchoring assemblies 30. Each anchoring assembly 30 in turn secures the vehicle tail light operational indicator 10 to a tail light 105 (see FIG. 1). Referring now primarily to FIGS. 3 and 4, attachment of an anchoring assembly 30 to the vehicle 100 is accomplished via a common double-faced adhesive 44 having a peel-off wax paper layer 46.

Refer now primarily to FIG. 4 for an exploded view of an anchoring assembly 30. The anchoring assembly 30 enables selectable angular adjustment of an associated threaded receiver 31. Each anchoring assembly 30 comprises an injection-molded plastic form having an integral rectangular base 34 and two (2) perpendicularly and upwardly extending anchoring assembly outer members 36. The outer members 36 are dimensioned to mate to an anchoring assembly inner member 35 of the threaded receiver 31 to form a three-element single-axis hinge. Metal friction washers 38 having grooved or knurled side surfaces disposed between the anchoring assembly inner member 35 and the anchoring assembly outer members 36.

Still referring to FIG. 4, in use a desired angle is selected between the threaded receiver 31 and the anchoring assembly 30, a bolt 40 is inserted through a first aperture 29 of the anchoring assembly inner member 35; second apertures 41 of the anchoring assembly outer member 36; and the friction washers 38. The bolt 40 is then cinched using a nut 42 to use frictional forces to stop angular motion between the anchoring assembly inner member 35 and the anchoring assembly outer member 36. However, impacts or sufficiently strong forces applied to the threaded receiver 31 with respect to the anchoring assembly 30 allows the vehicle tail light operational indicator 10 to rotate to protect itself from permanent damage.

Refer now to FIG. 5 for a partial break-away view of a first arm 24 and first arm pivot 62 of the vehicle tail light operational indicator 10. The arms 24, 26 (only the first arm 24 is shown but the arm 26 is similar) are attached to the anchoring assemblies 30 via pivot assemblies 60. During installation and/or configuration of the vehicle tail light operational indicator 10 the pivot assemblies 60 provide compliant rotary motion allowing a user to position the light bar 22 at a desired position. The pivot assembly 60 includes the pivot assembly inner member 61 which is secured between the two (2) pivot assembly outer members 62 via a pivot assembly axle 63. The pivot assembly axle 63 extends through a central axis of the pivot assembly inner member 61 and partially protrudes through the pivot assembly outer members 62. The second arm 26 comprises identical features.

Figure 6:
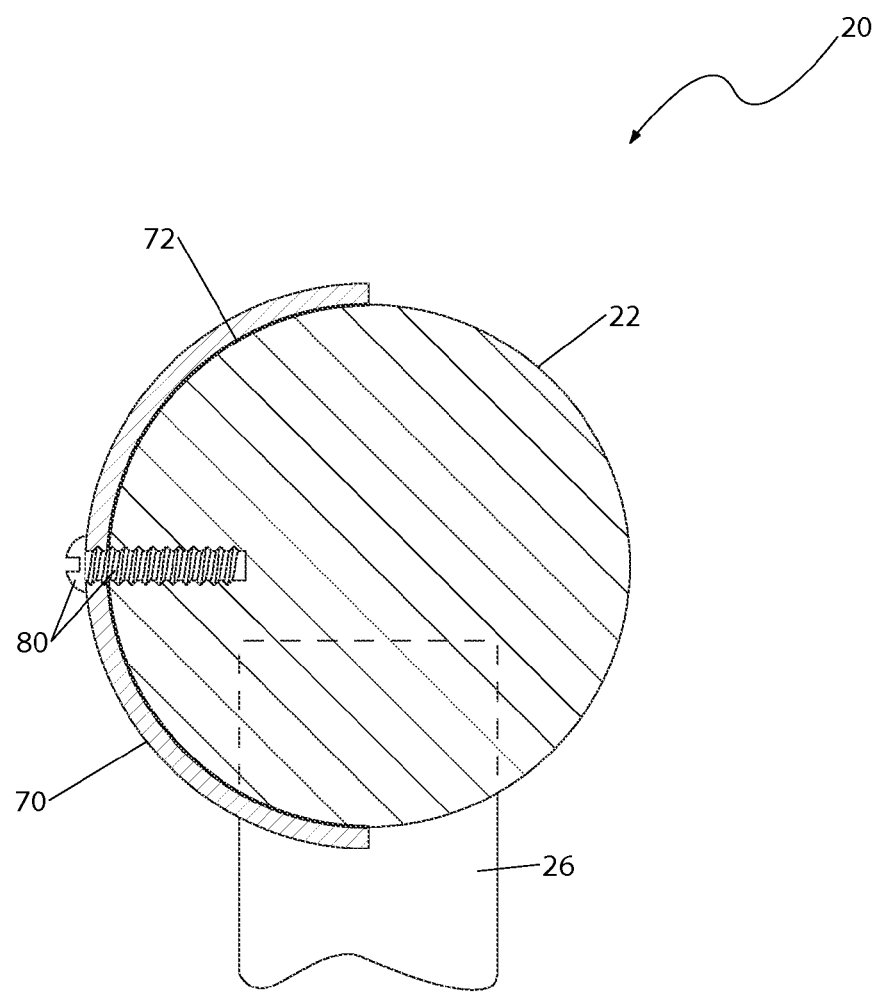

Refer now to FIG. 6 for a section view of a light bar 22 of the vehicle tail light operational indicator 10 taken along section line A-A of FIG. 5. The light bar 22 includes a reflective cap 70 which provides enhanced viewing of reflected light 106 from the tail lights 105. The reflective cap 70 comprises an opaque half-cylinder shaped, plastic form-fitting structure that is affixed to a rearward surface of the light bar 22 using a pair of threaded fasteners 80 (only one of which is shown in FIG. 6) such as screws. The reflective cap 70 enables blocking out reflected light received from trailing vehicles, thus providing the operator of the vehicle 100 a clear view of light 106 from the tail light 105. The reflective cap 70 further includes a metallic reflective layer 72 that is adhesively applied to an inner mating surface of the reflective cap 70 to further enhance reflection of light 106 from a tail light 105.

The angularly adjustable attachments of the arms 24, 26, the threaded receivers 31, the angular adjustability between the threaded receivers 31 and the anchoring assemblies 30, and the length-adjustable male 64 and the female 32 threaded members allows the vehicle tail light operational indicator 10 to be configured and adjusted to fit most popular vehicles 100. Furthermore, the adjustable features of the vehicle tail light operational indicator 10 allow the light bar 20 to be respectively positioned to protrude from the side of the vehicle 100, positioned at a desired front-to-rear location, positioned at various side-to-side angles, as well as positioned at a desired elevation above the ground. The vehicle tail light operational indicator 10 may also be disassembled and reassembled to provide both right-hand and left-hand embodiments for application upon opposing tail lights 105 (see FIG. 1).

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the vehicle tail light operational indicator 10 it would be installed as indicated in FIG. 1. Installation may be achieved by performing the following steps: procuring a pair of, or a unitary vehicle tail light operational indicator 10 based upon a corresponding number of rear-view mirrors 110 present upon a vehicle 100; loosening the jam nuts 33 and nut fasteners 42; configuring and adjusting the vehicle tail light operational indicator 10 so as to provide a desired custom fit upon a tail light 105 by angularly adjusting the anchoring assemblies 30 and pivot assemblies 60 to configure left-hand and/or right-hand embodiments as needed, if not previously configured; rotating the anchoring assemblies 30 and affixed threaded receivers 31 with respect to the attached male threaded members 64 as needed to position said anchoring assemblies 30 properly upon respective styles of tail lights 105; tightening said nut fasteners 42 and jam nuts 33; removing the protective wax paper layer 46 from the double-faced adhesive layers 44 of respective anchoring assemblies 30; positioning and adhesively affixing the anchoring assemblies 30 to the vehicle 100 by manually pressing the anchoring assemblies 30 onto desired locations upon lenses of the tail lights 105; verify proper operation of various functions of the tail lights 105 such as turn signals, brake lights, and the like, by observing illumination 106 fro the light bar 22 in a rear view mirror 110 while seated within the vehicle 100; performing subsequent checks of the tail lights 105 as desired while operating the vehicle 100 in a normal manner; and, benefiting from improved safety and peace of mind resulting from verification of tail light 105 functionality afforded a driver by the vehicle tail light operational indicator 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A vehicle tail light operational indicator, comprising:
   a transparent light bar assembly having a light bar with an integral first arm and an integral second arm that perpendicularly extend from the remainder of the light bar, wherein each first arm and second arm terminate in an associated pivot assembly inner member;
   at least two elongated threaded receivers, each comprising a "U"-shaped yoke pivot assembly outer member at one end of an extended male threaded member that threads into an elongated internal female threaded member attached to an associated anchoring assembly inner member; and,
   a first anchor assembly and a second anchor assembly, each having an integral rectangular base and two perpendicularly extending anchoring assembly outer members that are dimensioned to receive an anchoring assembly inner member;
   wherein each pivot assembly inner member mates with a pivot assembly outer member to a form a single-axis pivot assembly;
   wherein each anchoring assembly inner member mates with two anchoring assembly outer members to form a three-element single-axis hinge using a bolt as an axle; and,
   wherein each male threaded member forms a collinear length adjustable connection with an associated elongated internal female threaded member.

2. The vehicle tail light operational indicator according to claim 1 wherein each pivot assembly inner member mates with a pivot assembly outer member using an axle.

3. The vehicle tail light operational indicator according to claim 2 wherein each pivot assembly allows relative angular adjustment of said transparent light bar assembly along only one axis.

4. The vehicle tail light operational indicator according to claim 1 wherein said transparent light bar assembly is comprised of transparent rod-shaped elements.

5. The vehicle tail light operational indicator according to claim 1 wherein said elongated threaded receivers are comprised of transparent stock.

6. The vehicle tail light operational indicator according to claim 1, wherein said first anchor assembly and said second anchor assembly are configured to attach to a vehicle tail light.

7. The vehicle tail light operational indicator according to claim 6 wherein said first anchor assembly includes a double-faced adhesive tape for attaching to the vehicle tail light.

8. The vehicle tail light operational indicator according to claim 1 wherein said collinear length adjustable connection is locked using a jam nut.

9. The vehicle tail light operational indicator according to claim 1 wherein each anchoring assembly inner member mates with two anchoring assembly outer members using a bolt that passes through an aperture in said anchoring assembly inner member.

10. The vehicle tail light operational indicator according to claim 9 further including a friction washer disposed between said anchoring assembly inner member and said anchoring assembly outer members.

11. The vehicle tail light operational indicator according to claim 10 wherein said friction washer is metallic and has a knurled surface.

12. The vehicle tail light operational indicator according to claim 11 further including a nut for tightening said bolt to inhibit angular motion between said anchoring assembly inner member and said anchoring assembly outer member.

13. The vehicle tail light operational indicator according to claim 1, further including a reflective cap affixed to said light bar.

14. The vehicle tail light operational indicator according to claim 13, further including at least one threaded fastener affixing said reflective cap to said light bar.

15. The vehicle tail light operational indicator according to claim 13, further including a metallic reflective layer applied to a surface of said reflective cap.

* * * * *